US010723388B2

(12) United States Patent
Hinz

(10) Patent No.: US 10,723,388 B2
(45) Date of Patent: Jul. 28, 2020

(54) VEHICLE ROOF STRUCTURE

(71) Applicant: Honda Motor Co., Ltd., Tokyo (JP)

(72) Inventor: Christopher Hinz, Worthington, OH (US)

(73) Assignee: Honda Motor Co., Ltd., Tokyo (JP)

(*) Notice: Subject to any disclaimer, the term of this patent is extended or adjusted under 35 U.S.C. 154(b) by 116 days.

(21) Appl. No.: 16/181,836

(22) Filed: Nov. 6, 2018

(65) Prior Publication Data
US 2019/0071129 A1 Mar. 7, 2019

Related U.S. Application Data

(63) Continuation of application No. 15/591,938, filed on May 10, 2017, now Pat. No. 10,150,513, and a continuation of application No. 15/046,102, filed on Feb. 17, 2016, now Pat. No. 9,676,426.

(51) Int. Cl.
B60R 13/07 (2006.01)
B62D 25/06 (2006.01)
B62D 29/00 (2006.01)
B60R 9/04 (2006.01)
B62D 27/02 (2006.01)

(52) U.S. Cl.
CPC ............... B62D 25/06 (2013.01); B60R 9/04 (2013.01); B62D 27/026 (2013.01); B62D 29/00 (2013.01); B62D 29/007 (2013.01); B62D 29/008 (2013.01)

(58) Field of Classification Search
CPC ...... B62D 25/06; B60R 21/213; B60R 21/232; B60R 13/0206; B60R 9/04; B60R 13/025; B60R 2021/0435; B60R 21/04; B60J 10/82
See application file for complete search history.

(56) References Cited

U.S. PATENT DOCUMENTS

| 4,293,161 | A | 10/1981 | Lutz |
| 5,318,338 | A | 6/1994 | Ikeda |
| 5,681,076 | A | 10/1997 | Yoshii |
| 5,873,618 | A | 2/1999 | Ejima |
| 6,340,204 | B1 | 1/2002 | Seifert |
| 6,409,258 | B1 | 6/2002 | Grimm et al. |
| 6,513,865 | B1 | 2/2003 | Lutz et al. |
| 6,945,592 | B1 | 9/2005 | Hui et al. |
| 7,182,381 | B2 | 2/2007 | Ogawa et al. |
| 7,293,823 | B2 | 11/2007 | Chen et al. |
| 7,393,047 | B2 * | 7/2008 | Hirotani ............. B62D 25/06 296/214 |
| 7,407,224 | B2 | 8/2008 | Okabe et al. |
| 7,475,936 | B2 | 1/2009 | Guicheteau |
| 7,543,884 | B2 | 6/2009 | Reed et al. |

(Continued)

FOREIGN PATENT DOCUMENTS

JP 2000-272541 A 10/2000
JP 2003-341547 A 12/2003
JP 2011-073569 A 4/2011

Primary Examiner — Kiran B Patel
(74) Attorney, Agent, or Firm — Honda Patents & Technologies North America, LLC; William R. Fisher

(57) ABSTRACT

A vehicle roof structure is provided that includes a vehicle body and a roof. The vehicle body comprises a first material, and the roof comprises a second material that is different than the first material. The roof includes a flange. An insert is positioned between the vehicle body and the roof to maintain a gap between the vehicle body and the flange.

20 Claims, 14 Drawing Sheets

(56) References Cited

U.S. PATENT DOCUMENTS

| | | |
|---|---|---|
| 7,731,275 B2 | 6/2010 | Bergmiller et al. |
| 7,775,586 B2 * | 8/2010 | Hallik .................... B62D 25/06 296/193.04 |
| 7,900,997 B2 | 3/2011 | Hosaka et al. |
| 7,997,643 B2 | 8/2011 | Shah et al. |
| 8,205,923 B2 | 6/2012 | Mourou |
| 8,215,708 B2 | 7/2012 | Grüneklee et al. |
| 8,322,771 B2 | 12/2012 | Mihai |
| 8,424,961 B2 | 4/2013 | Carsley et al. |
| 8,636,197 B1 | 1/2014 | Hill et al. |
| 8,651,566 B2 | 2/2014 | Nakaaki |
| 8,770,657 B2 * | 7/2014 | Shirai .................... B62D 25/07 296/203.03 |
| 8,820,824 B1 * | 9/2014 | Hinz .................... B62D 29/008 296/187.13 |
| 8,899,669 B2 | 12/2014 | Yoshida |
| 8,915,540 B2 | 12/2014 | Nishimura et al. |
| 9,079,618 B2 | 7/2015 | Ishigame et al. |
| 9,114,836 B1 | 8/2015 | Hinz et al. |
| 9,126,632 B2 | 9/2015 | Ono |
| 9,394,018 B2 | 7/2016 | Kisaku et al. |
| 9,440,683 B1 | 9/2016 | Donabedian |
| 9,475,444 B2 | 10/2016 | Berberoglu et al. |
| 9,586,638 B2 | 3/2017 | Huhn |
| 2003/0011213 A1 * | 1/2003 | Zinsmeister ........... B62D 25/06 296/210 |
| 2004/0046423 A1 * | 3/2004 | Wieber .................. B62D 25/06 296/203.03 |
| 2004/0124673 A1 * | 7/2004 | Schonebeck ........... B62D 21/15 296/210 |
| 2004/0212222 A1 | 10/2004 | Katsuma |
| 2005/0104418 A1 * | 5/2005 | Zirbs ...................... B62D 25/06 296/210 |
| 2005/0116509 A1 | 6/2005 | Ido et al. |
| 2005/0206201 A1 | 9/2005 | Iimori |
| 2006/0237997 A1 * | 10/2006 | Wendler ................ B62D 25/06 296/193.04 |
| 2007/0200314 A1 | 8/2007 | Anderson et al. |
| 2008/0100100 A1 * | 5/2008 | Huisman ............. B60R 13/0225 296/215 |
| 2008/0106124 A1 | 5/2008 | Snider |
| 2008/0122259 A1 | 5/2008 | Matsui |
| 2008/0178467 A1 | 7/2008 | Hayashi et al. |
| 2010/0052369 A1 | 3/2010 | Park |
| 2010/0140982 A1 * | 6/2010 | Hosaka .................. B62D 25/06 296/210 |
| 2010/0276969 A1 | 11/2010 | Auchter-bruening et al. |
| 2011/0121614 A1 | 5/2011 | Kobayashi et al. |
| 2012/0061998 A1 * | 3/2012 | Carsley ................. B62D 25/06 296/210 |
| 2012/0153676 A1 | 6/2012 | Shono |
| 2012/0292950 A1 * | 11/2012 | Stahlhut ................ B62D 25/06 296/210 |
| 2013/0309520 A1 * | 11/2013 | Lang ........................ F16B 5/10 428/594 |
| 2014/0217783 A1 * | 8/2014 | Hida ...................... B62D 25/06 296/210 |
| 2015/0137563 A1 * | 5/2015 | Eberle ...................... B60R 9/04 296/215 |
| 2015/0217812 A1 | 8/2015 | Hinz et al. |

* cited by examiner

VEHICLE ROOF STRUCTURE

CROSS-REFERENCE TO RELATED APPLICATION

This application is a continuation of prior U.S. patent application Ser. No. 15/591,938 filed on May 10, 2017, which is a continuation of prior U.S. patent application Ser. No. 15/046,102 filed on Feb. 17, 2016. The disclosures of the prior applications are incorporated in their entirety herein by reference.

BACKGROUND

The substitution of lightweight roof panels for the low-carbon steel or steel alloy roof panels most commonly used in motor vehicles is an attractive option for vehicle mass reduction. Often, however, the remainder of the vehicle body structure is fabricated of a dissimilar material. The joining of dissimilar materials can be problematic. For example, joining an aluminum or aluminum-based alloy roof panel to a steel body panel may be difficult due to the thermal expansion considerations of the dissimilar materials. The combination of the aluminum roof panel attached to the steel body may create compressive stresses in the aluminum roof panel when subjected to elevated temperatures.

SUMMARY

In accordance with one embodiment, a vehicle roof structure is provided that includes a vehicle body and a roof that includes a flange. An insert is positioned between the vehicle body and the roof to maintain a gap between the vehicle body and the flange. An adhesive is positioned in the gap to bond the flange to the vehicle body.

In accordance with one embodiment, a vehicle roof structure is provided that includes a vehicle body comprising a first material, and a roof comprising a second material having a lower rigidity than the first material. The roof includes a flange. An insert is positioned between the vehicle body and the roof to maintain a gap between the vehicle body and the flange. At least a portion of the insert is less rigid than the roof. Optionally, an adhesive is positioned in the gap to bond the flange to the vehicle body, and the adhesive extends along the flange around a perimeter of the roof and the insert is positioned outward of the adhesive.

In accordance with one embodiment, a vehicle roof structure is provided that includes a vehicle body comprising a first material and a roof comprising a second material that is different than the first material. The roof includes a flange and at least a first tab extending outward from the flange. An insert is positioned between the vehicle body and the first tab to maintain a gap between the vehicle body and the flange. An adhesive is positioned in the gap to bond the flange to the vehicle body. Optionally, the adhesive extends along the flange around a perimeter of the roof and the insert is positioned outward of the adhesive. Optionally, the tab extends outward from and substantially perpendicular to a longitudinal centerline of the roof and a portion of the insert is secured to the vehicle body at a position outward beyond the tab along the length of the roof.

In accordance with one embodiment, a vehicle roof structure is provided with a roof including a flange and a vehicle body including an outer panel and an inner panel. The outer panel includes a first part that is joined at a weld with the inner panel, and a second part that extends from the first part and is positioned closer to a longitudinal centerline of the roof than the first part. An insert is positioned between the first part of the outer panel and the flange to maintain a gap between the flange and the second part of the outer panel. An adhesive is positioned in the gap to bond the flange to the second part of the outer panel.

In accordance with one embodiment, a vehicle roof structure is provided that includes a vehicle body comprising a first material, and a roof comprising a second material that is different than the first material. The roof includes a flange. An insert is positioned between the vehicle body and the roof to maintain a gap between the vehicle body and the flange. A roof rack is secured to the insert. Optionally, the insert includes a roof member secured to the roof and the vehicle body that is positioned between the vehicle body and the roof to maintain the gap between the vehicle body and flange, and a roof rack member secured to the roof rack and the vehicle body. The roof member may include at least a portion that is less rigid than the roof, and the roof rack member may have a higher rigidity than the roof. Optionally, the roof includes a plurality of tabs extending outward from the flange away from a longitudinal centerline of the roof, and the roof rack member is positioned along the length of the roof between two of the tabs.

In accordance with one embodiment, a vehicle roof structure is provided that includes a steel or steel alloy vehicle body, an aluminum or aluminum-based alloy roof that includes a flange, an insert positioned between the vehicle body and the flange to maintain a gap between the vehicle body and the flange. At least a portion of the insert is less rigid than the roof, and a roof rack is secured to the insert. An adhesive may be positioned in the gap that bonds the flange to the vehicle body. The adhesive may extend along the flange around a perimeter of the roof and the insert may be positioned outward of the adhesive.

In accordance with one embodiment, a method of assembling a vehicle roof structure is provided that includes providing a vehicle body and a roof. The roof includes a flange extending outward from the roof. In addition, the method includes positioning an insert between the vehicle body and the roof to maintain a gap between the vehicle body and the flange. The method optionally includes securing a roof rack to the insert. The method optionally includes applying an adhesive to the roof or the vehicle body and positioning the adhesive in the gap to bond the flange to the vehicle body.

In accordance with one embodiment, a method of assembling a vehicle roof structure is provided that includes providing a vehicle body comprising a first material, and a roof comprising a second material having a lower rigidity than the first material. The roof includes a flange. In addition, the method includes positioning an insert between the vehicle body and the roof to maintain a gap between the vehicle body and the flange. At least a portion of the insert is less rigid than the roof. The method optionally includes applying an adhesive to the roof or the vehicle body and positioning the adhesive in the gap to bond the flange to the vehicle body. Optionally, the adhesive extends along the flange around a perimeter of the roof and the insert is positioned outward of the adhesive.

In accordance with one embodiment, a method of assembling a vehicle roof structure is provided that includes providing a vehicle body comprising a first material and a roof comprising a second material that is different than the first material. The roof includes a flange and at least a first tab extending outward from the flange. The method also includes applying an adhesive to the roof or the vehicle body, and positioning an insert between the vehicle body and the first tab to maintain a gap between the vehicle body and the flange. The adhesive is positioned in the gap to bond the flange to the vehicle body. Optionally, the adhesive extends along the flange around a perimeter of the roof and the insert is positioned outward of the adhesive. Optionally, the tab extends outward substantially perpendicular to a longitudinal centerline of the roof, and a portion of the insert is secured to the vehicle body at a position outward beyond the tab along the length of the roof.

In accordance with one embodiment, a method of assembling a vehicle roof structure is provided that includes providing a roof including a flange and a vehicle body including an outer panel and an inner panel. The outer panel includes a first part and a second part that extends from the first part. The method also includes applying an adhesive to the roof or the vehicle body, and positioning an insert between the first part of the outer panel and the flange to maintain a gap between the flange and the second part of the outer panel. The adhesive is positioned in the gap to bond the flange and the second part of the outer panel, and the second part of the outer panel is positioned closer to a longitudinal centerline of the roof than the first part.

In accordance with one embodiment, a method of assembling a vehicle roof structure is provided that includes providing a vehicle body comprising a first material, and providing a roof comprising a second material that is different than the first material. The roof includes a flange extending outward from the roof and at least a first tab extending outward from the flange. In addition, the method includes securing an insert to the tab or the vehicle body, applying an adhesive to the vehicle body or the roof, and positioning the roof and vehicle body so that the insert is positioned between the vehicle body and the first tab to maintain a gap between the vehicle body and the flange so that the adhesive is positioned in the gap to bond the flange to the vehicle body. Optionally, the insert includes a joining member extending therefrom. Accordingly, the method may include securing a roof rack to the joining member.

In accordance with one embodiment, a method of assembling a vehicle roof structure is provided that includes providing a steel or steel alloy vehicle body, an aluminum or aluminum-based alloy roof that includes a flange, and an insert, and positioning the insert between the vehicle body and the flange to maintain a gap between the vehicle body and the flange. At least a portion of the insert is less rigid than the roof. In addition, the method includes positioning an adhesive in the gap to bond the flange to the vehicle body, and securing a roof rack to the insert. The adhesive extends along the flange around a perimeter of the roof and the insert is positioned outward of the adhesive.

In accordance with one embodiment, a method of assembling a vehicle roof structure is provided that includes providing a roof including a flange with a tab extending outward from the flange, and providing a vehicle body including an outer panel and an inner panel, the outer panel including a first part and a second part that extends outward from the first part and the inner panel. In addition, the method includes securing an insert to the first part of the outer panel or the tab, applying an adhesive to the second part of the outer panel or the flange, and positioning the roof and the outer panel so that the insert is positioned between the first part of the outer panel and the tab to maintain a gap between the flange and the second part of the outer panel so that the adhesive is positioned in the gap to bond the flange to the second part of the outer panel. Optionally, the insert includes a joining member extending therefrom. Accordingly, the method may include securing a roof rack to the joining member.

DETAILED DESCRIPTION

It should be understood that the description and drawings herein are merely illustrative and that various modifications and changes can be made in the structures disclosed without departing from the present disclosure. In general, the figures of the exemplary vehicle roof structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle roof structure disclosed herein are merely terms of art that may vary from one manufacturer to another and should not be deemed to limit the present disclosure.

Figure 1:
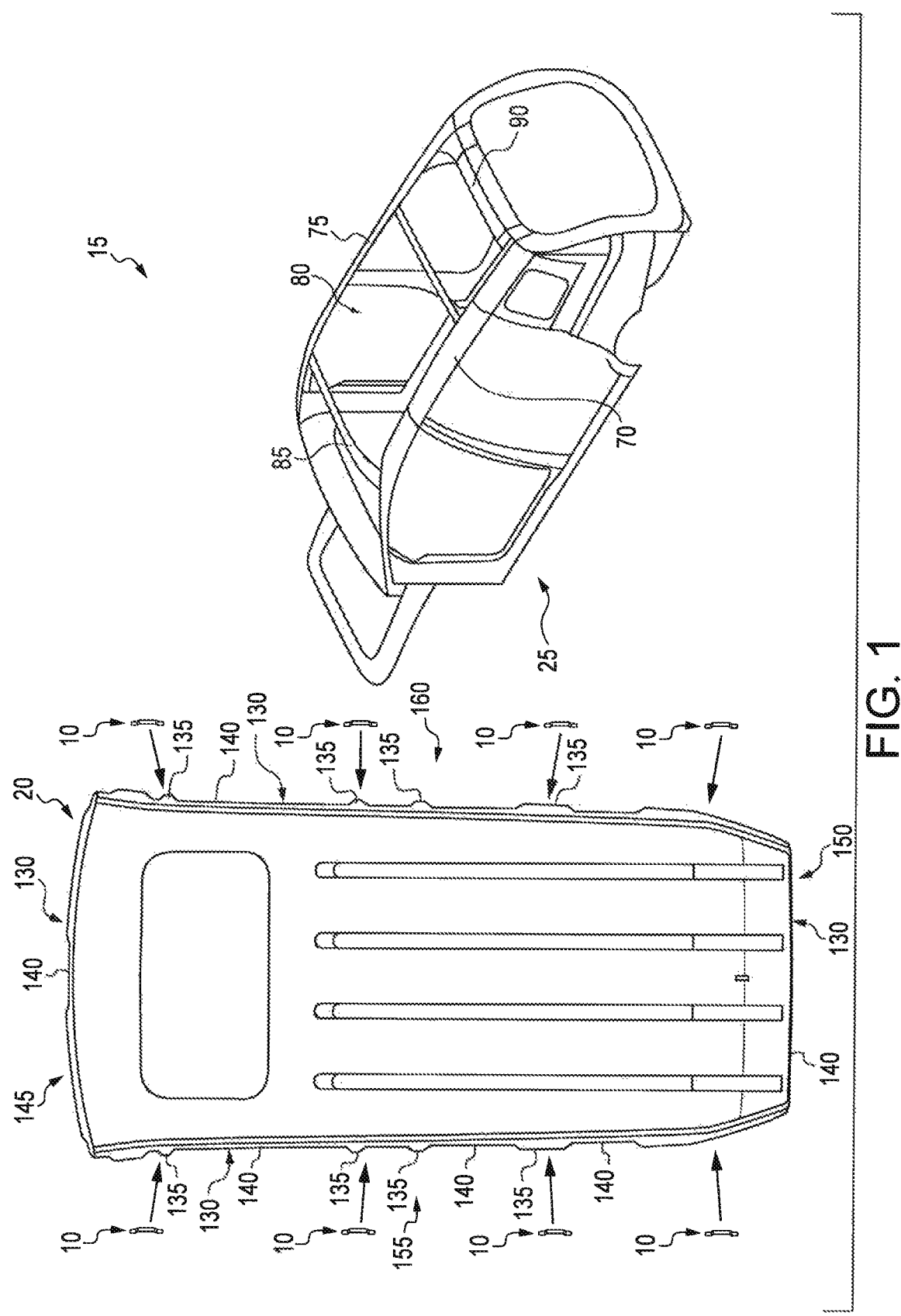
FIG. 1 is a view of an unassembled vehicle roof structure including a vehicle body, a vehicle roof, and an insert according to one aspect of the present disclosure.

In general, a vehicle roof structure 15 is provided. In a non-limiting example as shown in FIG. 1, the vehicle roof structure 15 includes an insert 10, a roof 20, and a vehicle body 25. The vehicle body 25 may include a pair of body members or side panels 70, 75, and a front roof rail 85 and a rear roof rail 90 spanning between the side panels 70, 75. The side panels 70, 75 may be identically constructed, but for their disposition on opposite sides of the body 25. The side panels 70, 75 together with the front and rear roof rails 85, 90, define the sides of a passenger compartment 80 over which the roof 20 is positioned. The roof 20 includes a forward end portion 145, a rearward end portion 150 and opposite side portions 155, 160 that extend longitudinally between the forward and rearward end portions 145, 150. The roof 20 also includes a flange 130 that extends about the peripheral edge of the roof 20 outward from one or more of the portions 145, 150, 155, 160 for attachment to the vehicle body 25.

Figure 2A:
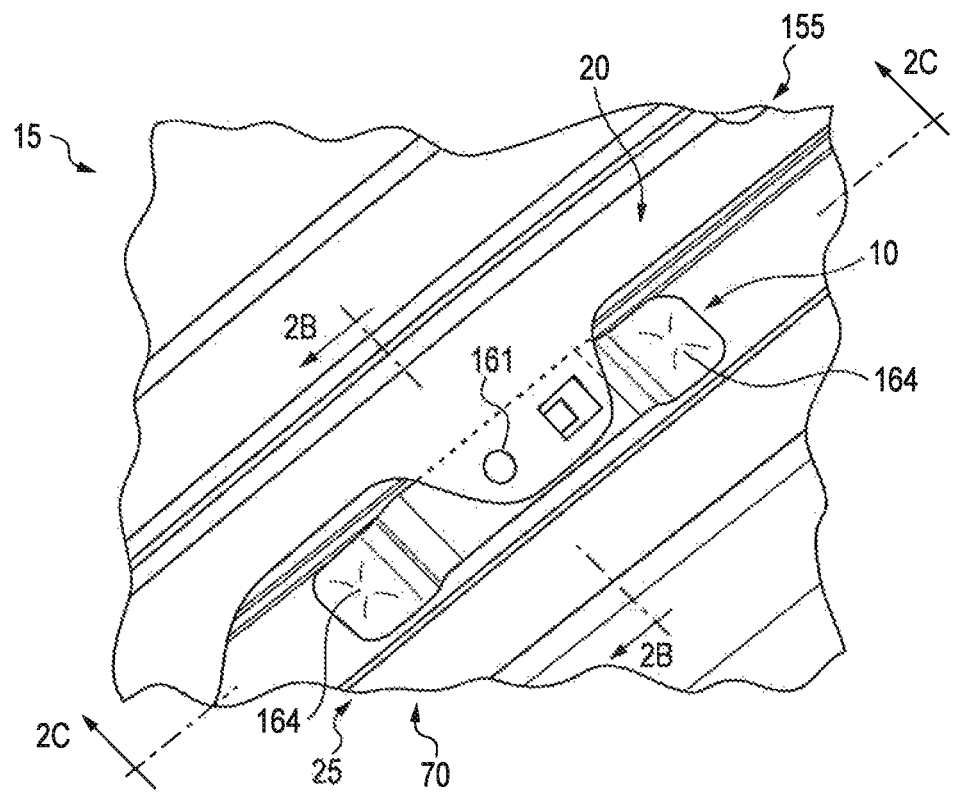
FIG. 2A is a partial overhead view of the vehicle roof structure according to one aspect of the present disclosure.
Figure 2B:
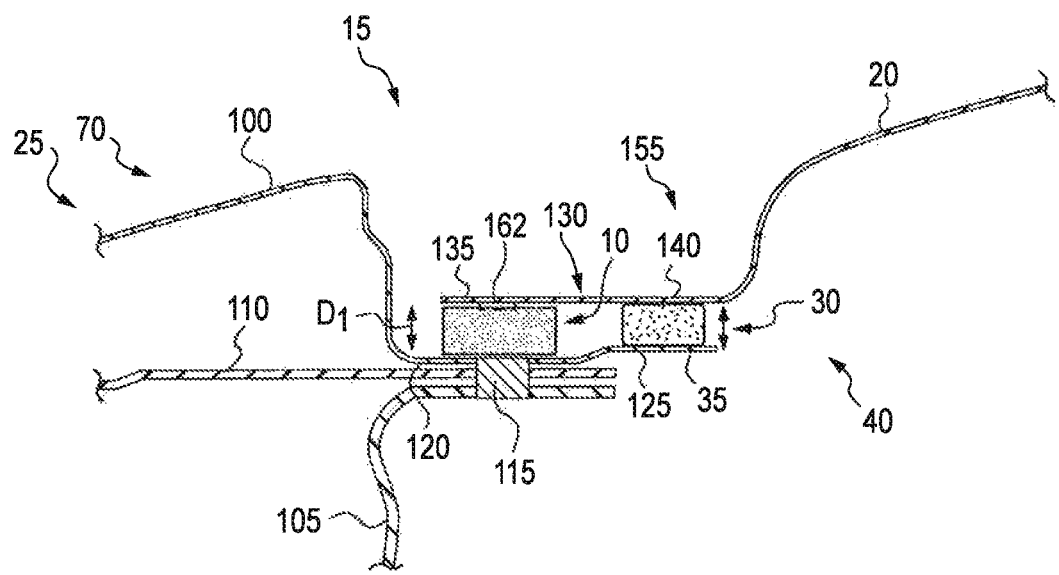
FIG. 2B is a cross-sectional view from line 2B-2B in FIG. 2A.
Figure 2C:
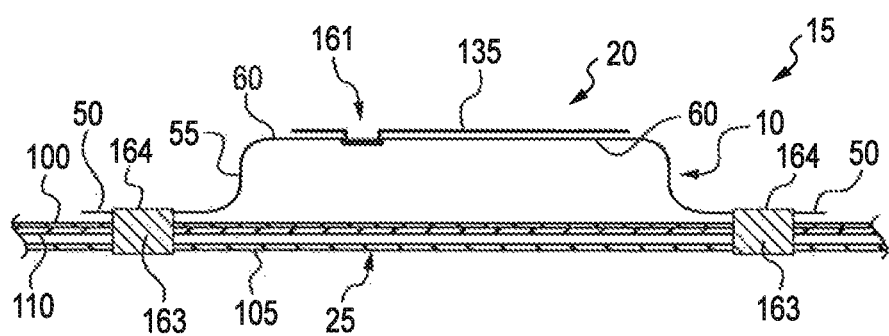
FIG. 2C is a cross-sectional view from line 2C-2C in FIG. 2A.
Figure 3A:
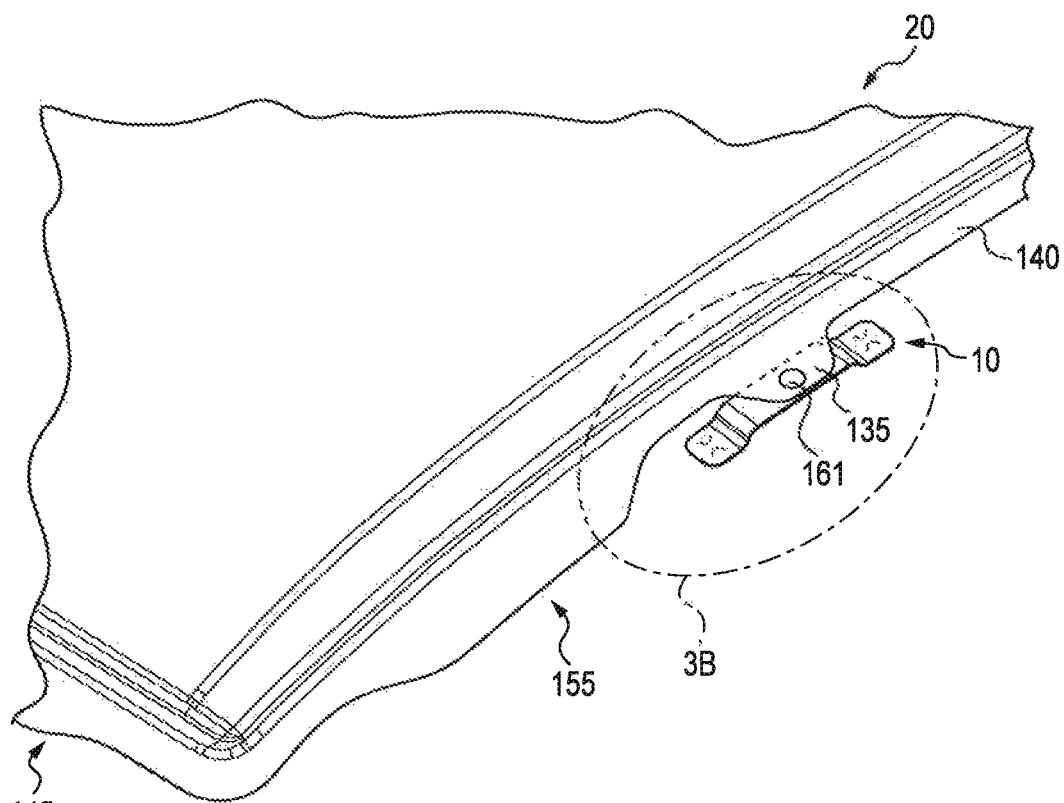
FIG. 3A is a partial perspective view of a longitudinal side of the roof with an insert secured thereto according to one aspect of the present disclosure.
Figure 3B:
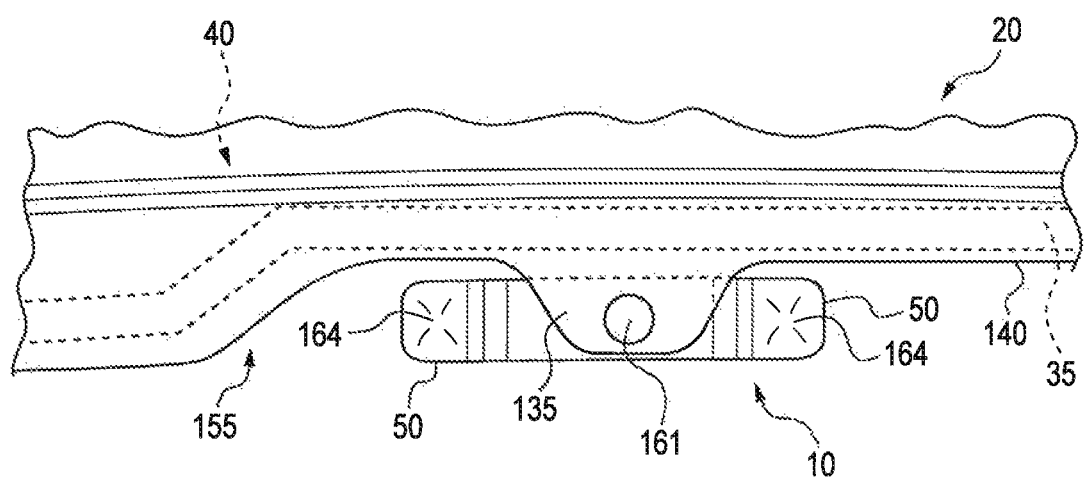
FIG. 3B is a partial overhead view of FIG. 3A.

In an embodiment shown in FIGS. 2A, 2B, and 2C, the insert 10 is positioned between the roof 20 and the vehicle body 25. During assembly of the vehicle roof structure 15, an adhesive 35 is provided on the roof 20, the vehicle body 25, or both the roof 20 and the vehicle body 25. The insert 10 is positioned between the roof 20 and the vehicle body 25 to support the roof 20 and maintain a continuous gap 30 to prevent the adhesive 35 from being squeezed out from between the roof 20 and the vehicle body 25 prior to curing of the adhesive 35. The gap 30 extends vertically between a horizontal portion 140 of the flange 130 and the side panels 70, 75 and the roof rails 85, 90 of the vehicle body 25. The adhesive 35 is positioned in the gap 30 and forms a perimeter along the roof 20 to directly bond the roof 20 to the side panels 70, 75 and the roof rails 85, 90. It is to be understood that the adhesive may be applied continuously in the gap 30 to form a continuous perimeter along the roof 20. The adhesive 35 also functions to seal a dry zone 40 that is protected from the intrusion of water/moisture and dirt and other debris. The adhesive 35 (and the gap 30) may have a thickness of approximately 4 mm to approximately 6 mm in the vertical or height direction. As shown in FIGS. 2B, 3A, and 3B, the insert 10 is positioned along the perimeter of the roof 20 entirely outward of the adhesive 35 and outside of the dry zone 40. However, all or part of the insert 10 may be positioned inward of the adhesive 35 in the dry zone 40. For example, a portion 162 of the insert 10 that is secured to the roof 20 may be positioned outward of the adhesive 35 and outside of the dry zone 40 while other portions (not shown) may be positioned in the dry zone 40.

Figure 4:
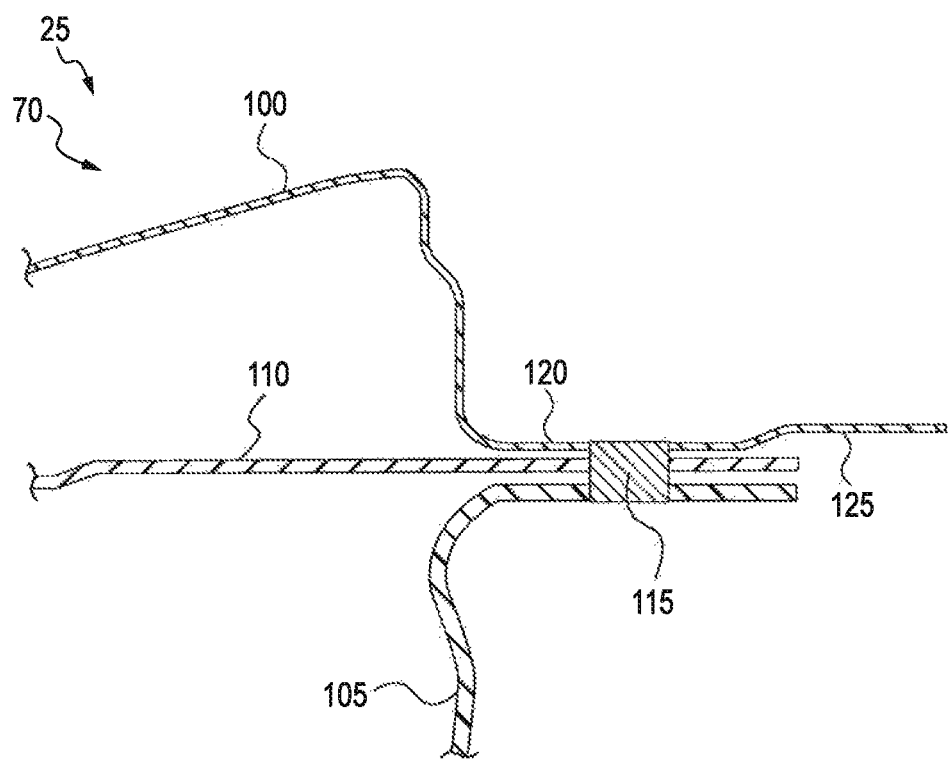
FIG. 4 is a cross-sectional view of a side panel of the vehicle body according to one aspect of the present disclosure.

The roof 20, the vehicle body 25, or both the roof 20 and the vehicle body 25 may include one or more physical features to, for example, accommodate assembly of the vehicle roof structure 15 and/or maintain a desired height or position of the gap 30. In a non-limiting example as shown in FIG. 4, the side panel 70 of the vehicle body 25 includes an outer panel 100, an inner panel 105, and optionally a reinforcement 110. A first part 120 of the outer panel 100 may be joined to the inner panel 105 (and optionally reinforcement 110) with one or more welds 115. A second part 125 of the outer panel 100 is provided that extends outward from the weld 115 and the first part 120 beyond the inner panel 105. The first part 120 and the second part 125 may have a stepped or tiered configuration depending on the desired dimensions of the gap 30 and the insert 10. Accordingly, as shown in FIG. 2B, the vehicle body 25 may be shaped so that the height of the gap 30 between the flange 130 and the second part 125 is less than the distance D1 between the flange 130 and the first part 120 where the insert 10 is positioned.

Figure 5:
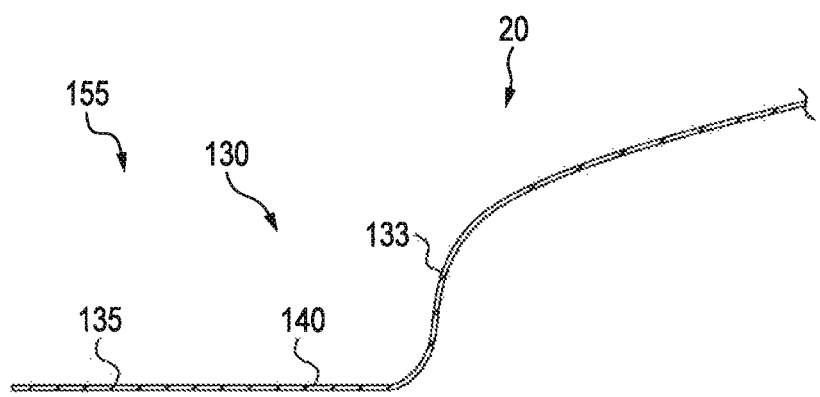
FIG. 5 is a cross-sectional view of a flange along a side portion of the roof according to one aspect of the present disclosure.

In a non-limiting example as shown in FIGS. 3A and 5, the flange 130 is generally defined by a vertical wall 133 and a horizontal portion 140. One or more discontinuous tabs 135 may extend outward from the horizontal portion 140. Accordingly, as shown in FIG. 2B, the first part 120 of the outer panel 100 may be positioned opposite and parallel to the tab 135, and the second part 125 of the outer panel 100 may be positioned opposite and parallel to the horizontal portion 140 of the flange 130. The insert 10 may be positioned between the tab 135 of the roof 20 and the first part 120 of the outer panel 100 to support the roof 20 and maintain the gap 30 between the horizontal portion 140 of the flange 130 and the second part 125 of the outer panel 100. As shown in FIG. 2B, the second part 125 of the outer panel 100 may extend outwardly beyond the inner panel 105 toward the longitudinal centerline 'C' of the roof 20.

Figure 6A:
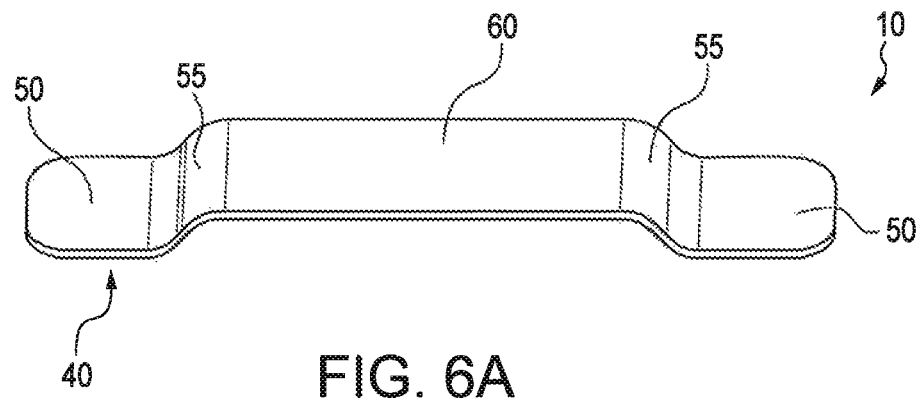
FIG. 6A is a perspective view of the insert according to one aspect of the present disclosure.
Figure 6B:
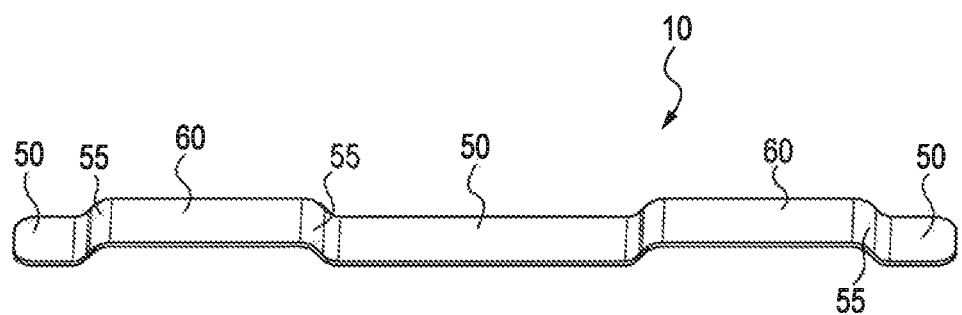
FIG. 6B is a perspective view of the insert according to one aspect of the present disclosure.

In a non-limiting example, the adhesive 35 forms the primary connection between the roof 20 and the vehicle body 25, whereas the insert 10 is more for positioning and supporting the roof 20 prior to curing of the adhesive 35. Therefore, the insert 10 may comprise any material capable of supporting the roof 20 prior to curing of the adhesive 35. Non-limiting examples of suitable materials for the insert 10 include metals, metal alloys, polymers, composites, and ceramics. Further, the insert 10 may be provided in any shape or form necessary to provide the desired gap 30 dimensions for the adhesive 35. In an illustrative example best shown in FIGS. 6A-6C, the insert 10 may include one or more feet 50 that is positionable on the vehicle body 25, one or more shoulders 60 for supporting the roof 20, and one or more legs 55 extending from the foot 50 to the shoulder 60. The legs 55 may extend from the feet 50 at an acute angle toward each other to the shoulder 60. As shown in FIGS. 2A and 2C, the one or more feet 50 of the insert 10 is secured to the vehicle body 25 at the portion 164 with an adhesive, a mechanical fastener, a weld 163, or a clinched connection. As shown in FIGS. 2A, 2B and 2C, the roof 20 is secured to the portion 162 of the insert 10 located, for example, on the shoulder 60, with a clinched connection 161. However, the present disclosure is not limited to the use of a clinched connection for securing the roof 20 to the portion 162 of the insert 10. Other non-limiting examples of materials or methods for securing the roof 20 to the portion 162 of the insert 10 include adhesives, mechanical fasteners, welds, or any combination thereof.

Figure 7:
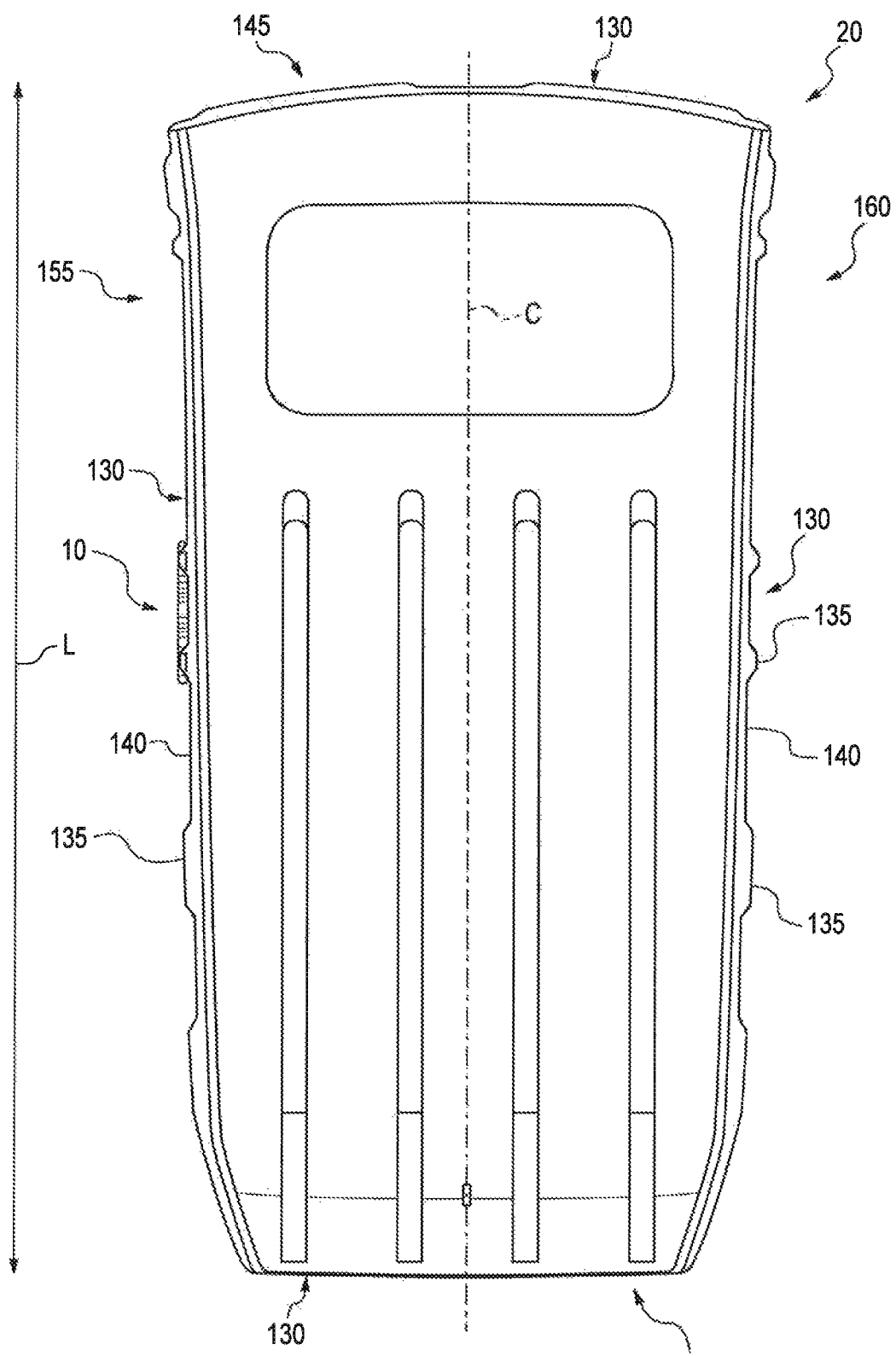
FIG. 7 is an overhead view of the insert of FIG. 6B secured to two tabs of the roof in one aspect of the present disclosure.

It is to be understood that any number of inserts 10 may be provided in the roof structure 15. As shown in FIG. 1, a plurality of inserts 10 may be provided for supporting a plurality of tabs 135 extending outwardly from opposite side portions 155/160 of the roof 20. Although not shown in FIG. 1, each insert 10 may be positioned outwardly of the adhesive 35 and outside of the dry zone 40. It is also to be understood that a single insert 10 (such as the insert 10 shown in FIG. 6B) may be used to support multiple tabs 135 as shown in FIG. 7.

The insert 10 may be configured to facilitate the assembly of a hybrid material vehicle roof structure 15. For example, the roof and the body of a conventional steel roof structure are joined by welding. However, when the roof 20 and body 25 are comprised of dissimilar materials, different joining technologies are used that require a separate assembly line or joining cell dedicated to that roof structure. In a non-limiting example, the roof 20 is comprised of an aluminum or aluminum-based alloy, the body 25 is comprised of steel or a steel alloy, and the insert 10 is comprised of steel or a steel alloy. The insert 10 may be the same grade or a different grade of steel or steel alloy than the body 25. As shown in FIGS. 3A and 3B, the tab 135 may be clinched 161 to the shoulder 60 to position the feet 50 of the insert 10 outward beyond the tab 135 along the length 'L' (shown in FIG. 7) of the roof 20. This allows for securing the portion 164 of the steel or steel alloy insert 10 to the steel or steel alloy vehicle body 25 after the roof 20 is positioned over the vehicle body 25. Accordingly, welding electrodes (not shown), such as spot-welding electrodes, can be lowered from above the vehicle body 25 to weld the feet 50 to the vehicle body 25 without interference from the roof 20. However, the present disclosure is not limited to spot-welds as any type of weld capable of securing the feet 50 to the vehicle body 25 may be used. Therefore, the insert 10 may allow for the aluminum or aluminum-based alloy roof 20 to be joined to the steel or steel alloy vehicle body 25 using the same assembly line and welding equipment as a conventional steel roof structure.

Figure 6C:
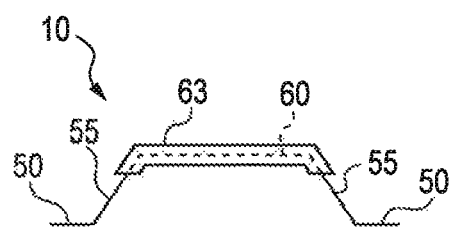
FIG. 6C is a side view of the insert of FIG. 6A with a partial coating according to one aspect of the present disclosure.

However, the assembly of dissimilar materials can lead not only to difficulties in joining the dissimilar parts, but also potentially to galvanic corrosion if exposed to a corrosive environment. Therefore, at least part of the insert 10, such as the portion of the shoulder 60 that is in direct contact with the aluminum or aluminum-based alloy roof 20, may be coated with a material for electrically insulating the steel or steel alloy insert 10 from the aluminum or aluminum-based alloy roof 20. Such coatings can include, but are not limited to, adhesives, zinc coatings, and aluminum coatings. In an illustrative example, the coating material is one available from NOF Metal Coatings North America Inc., under the GEOMET® trademark, which is formulated with an aqueous base and includes zinc and aluminum flakes in an inorganic binder. Such a coating provides barrier protection in that the overlapping zinc and aluminum flakes provide a barrier between the steel substrate and any potentially corrosive environment, and the zinc can also sacrificially corrode to protect the insert 10. In another illustrative example, the coating may be a galvanneal coating. However, some coatings such as the described GEOMET® coating make it difficult to weld the underlying material. Therefore, the coating 63 may be applied to only a portion of the insert 10 as shown in FIG. 6C. For example, the coating 63 may be applied by dipping the insert 10 into the GEOMET® coating material. Accordingly, the shoulder 60 of the insert 10 can be electrically insulated from the aluminum or aluminum-based alloy roof 20 while a portion of the insert 10, such as the feet 50, can remain uncoated for welding to the steel or steel alloy body 25. However, it is to be understood that the insert 10 may be fully coated to protect the insert 10 from corrosion. For example, the coating may be one that is compatible with welding and that would allow for the feet 50 to be welded to the steel or steel alloy body 25. In another non-limiting example, the insert 10 may be entirely coated with a coating that is not substantially compatible with welding and the feet 50 of the insert 10 may be joined to the steel or steel alloy body 25 with a mechanical fastener, adhesive, clinched connection, and the like. Accordingly, the type of coating and the extent of coating coverage on the insert 10 may be tailored for the desired method of securing the insert 10 to the body 25.

In an embodiment, the roof 20 is comprised of a first material, and the vehicle body 25 is comprised of a second material that is more rigid than the first material. For example, the roof 20 may be aluminum or an aluminum-based alloy, and the vehicle body 25 may be formed of steel or a steel alloy. However, rigidly attaching dissimilar materials (i.e., vehicle components with dissimilar coefficients of thermal expansion—about $22.5 \times 10^{-6}$ m/m K for aluminum and about $13 \times 10^{-6}$ m/m K for steel) will generate thermal stresses when the temperature is raised or lowered. The highest temperature experienced by the vehicle body is during manufacture, typically when the vehicle is painted. Automotive paint consists of a number of layers, applied separately and then cured at an elevated temperature. The paint is cured by passing the painted body through one or more paint bake ovens to raise the body temperature to about 200° C. This elevated temperature may be sufficient to initiate plastic deformation in the aluminum or aluminum-based alloy roof 20. Since plastic deformation is not reversed on cooling, any such deformation may result in an appearance feature such as a crease or buckle in the roof 20 which could result in an undesirable appearance.

Figure 8A:
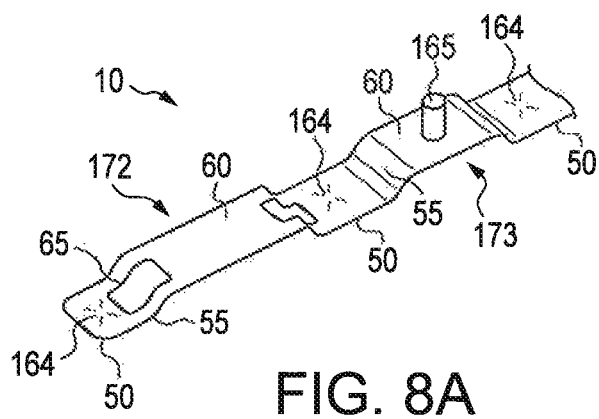
FIGS. 8A, 8B, and 8C are perspective views of the insert according to different aspects of the present disclosure.
Figure 8B:
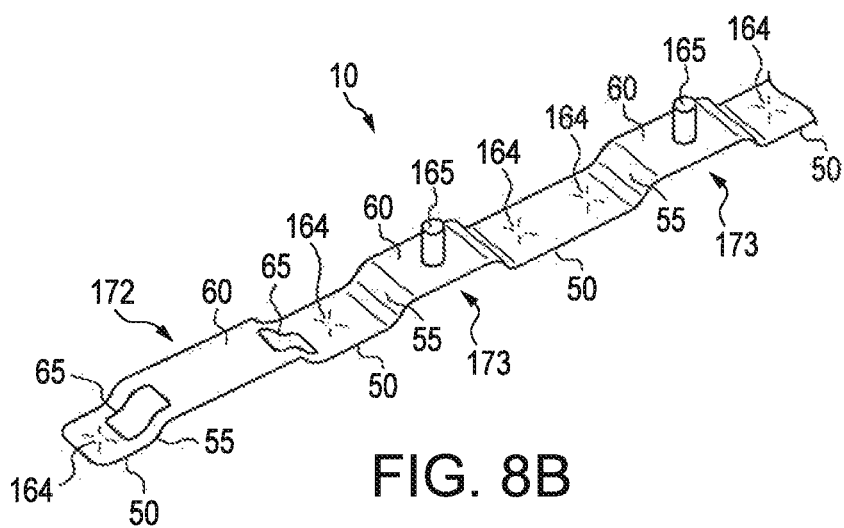
Figure 8C:
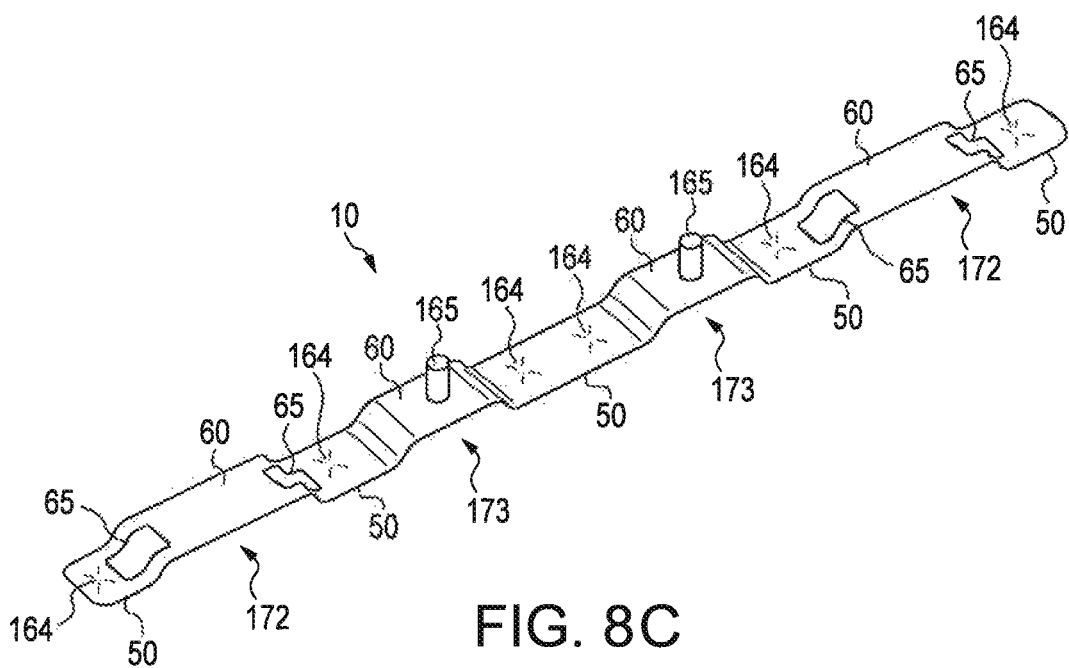

Therefore, at least a portion of the insert 10 may be less rigid than the roof 20 to allow the insert 10 to deform to accommodate thermal strain. The ability of the insert 10 to deform allows the roof 20 to distort during baking and curing of the adhesive 35 and/or during baking of the painted vehicle without significant deformation of the roof 20. For example, the insert 10 may comprise a material strong enough to support the roof 20 before curing of the adhesive 35, but less rigid than the roof 20 to accommodate thermal strain. The entire insert 10 may be less rigid than the roof 20. Alternatively, only one or more portions of the insert 10 may be less rigid than the roof 20. In a non-limiting example as shown in FIGS. 8A, 8B, and 8C, the insert 10 may include a relief feature 65 that lowers the rigidity of the insert 10 to allow the insert 10 to deform to accommodate thermal strain. Accordingly, the insert 10 may comprise a material that is more rigid than the roof 20 but is strategically weakened by the relief feature 65 to be less rigid at that portion of the insert 10 than the roof 20. Although the relief feature 65 is illustrated as an aperture in one or more of the legs 55 of the insert 10, it is to be understood that the relief feature 65 is not limited to such apertures or limited to being positioned on the legs 55. Other examples of relief features 65 include, but are not limited to, one or more regions locally heat treated to provide the desired rigidity, one or more apertures, one or more notches or recesses, one or more thinned sections, or any combination thereof.

Figure 9:
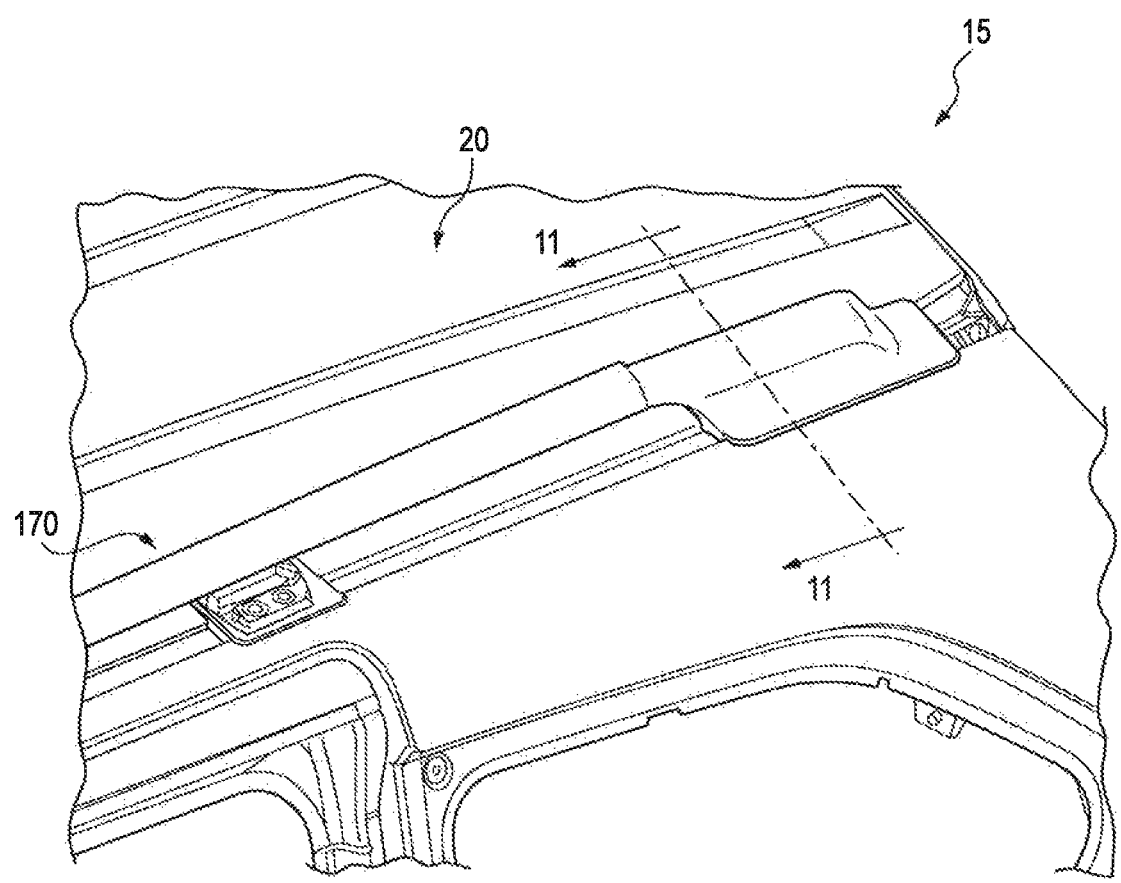
FIG. 9 is a perspective view of the vehicle roof structure including a roof rack according to one aspect of the present disclosure.
Figure 10A:
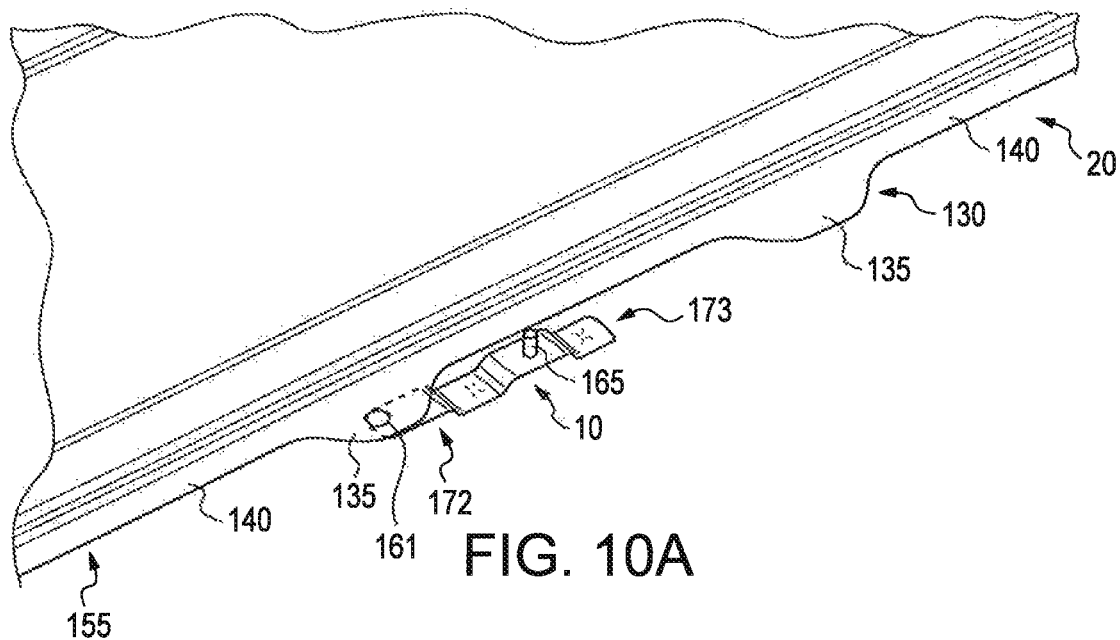
FIGS. 10A, 10B, and 10C are perspective views of the insert secured to the roof according to different aspects of the present disclosure.
Figure 10B:
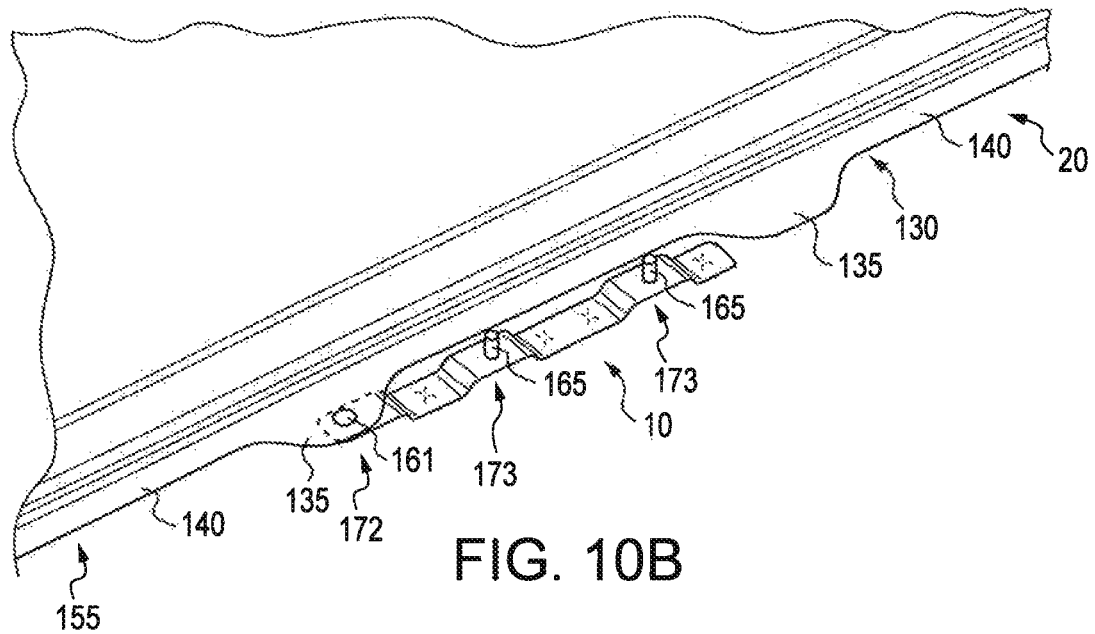
Figure 10C:
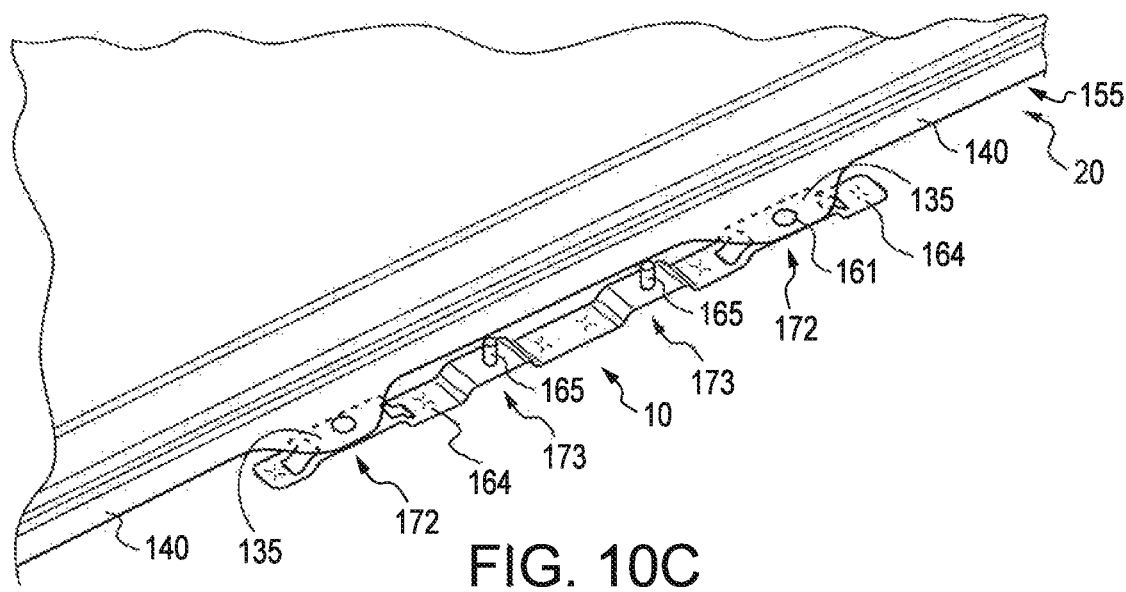
Figure 10D:
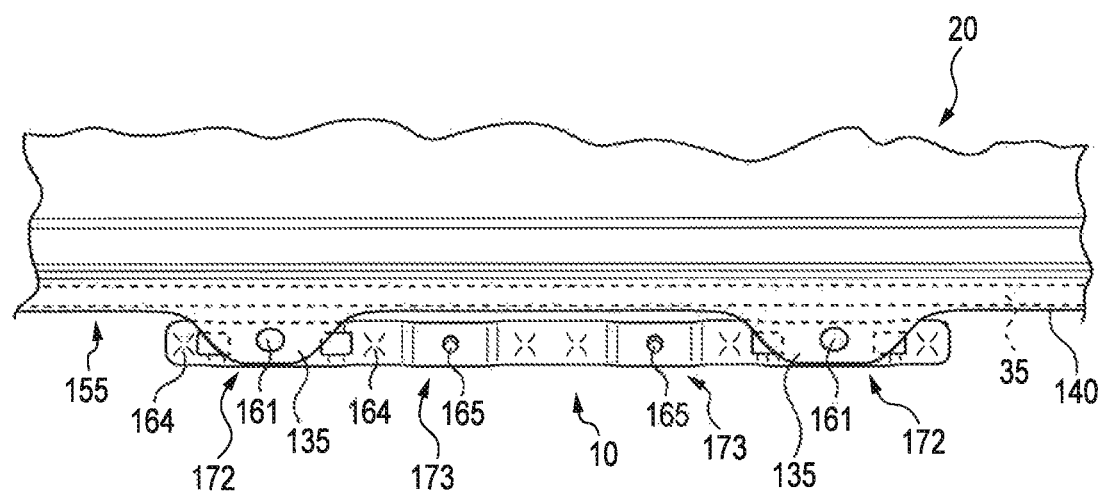
FIG. 10D is an overhead view of FIG. 10C.

In an embodiment as shown in FIG. 9, a roof rack 170 may be provided that is secured to the insert 10. As shown in FIGS. 8A, 8B, and 8C, the insert 10 may include a roof member 172 and a roof rack member 173. The roof rack member 173 may include one or more joining members 165, such as a threaded rod, for securing the roof rack 170 thereto. Although shown as extending from the raised shoulder 60 of the roof rack member 173, it is to be understood that the joining member 165 may extend from any portion of the insert 10. In a non-limiting example, the roof rack member 173 may include one or more joining members 165 and the roof member 172 may include one or more relief structures 65. Accordingly, the roof member 172 may have a lower rigidity than the roof 20, and the roof rack member 173 may have a higher rigidity than the roof 20. The roof member 172 is secured to the tab 135 and the vehicle body 25. The roof rack member 173 is secured to the vehicle body 25 and the roof rack 170. Therefore, the roof member 172 supports the roof 20 to maintain the gap 30 and is deformable to accommodate thermal stresses without significantly deforming the roof 20 or the roof rack member 173, thereby maintaining the dimensional accuracy of the roof rack member 173, the joining member 165, and roof rack 170 secured thereto. As best shown in FIGS. 10A, 10B, 10C, and 10D, the roof rack member 173 and the joining member 165 may be positioned along the length 'L' of the roof 20 between two of the tabs 135.

Figure 11:
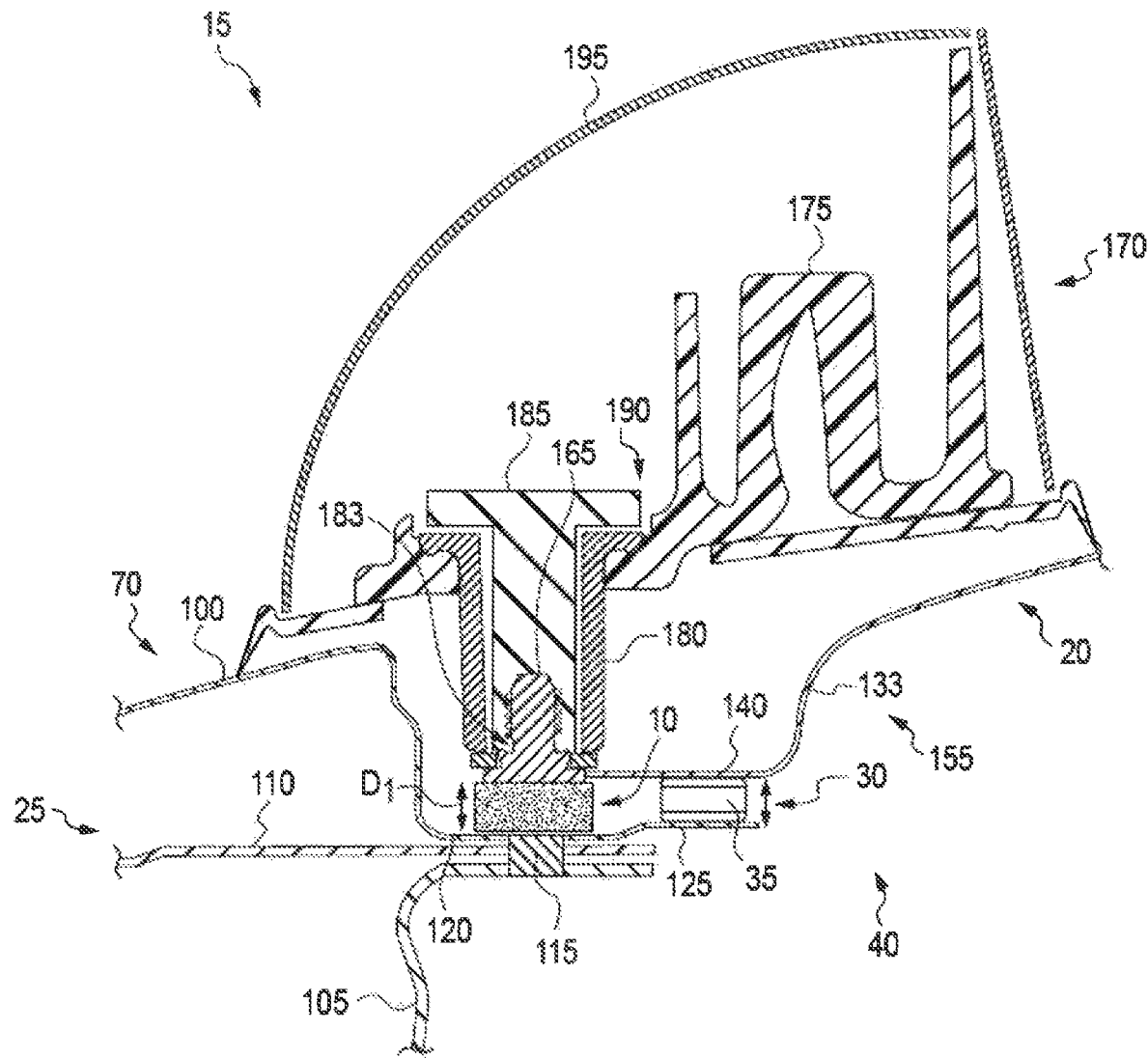
FIG. 11 is a cross-sectional view from line 11-11 in FIG. 9.
Figure 12:
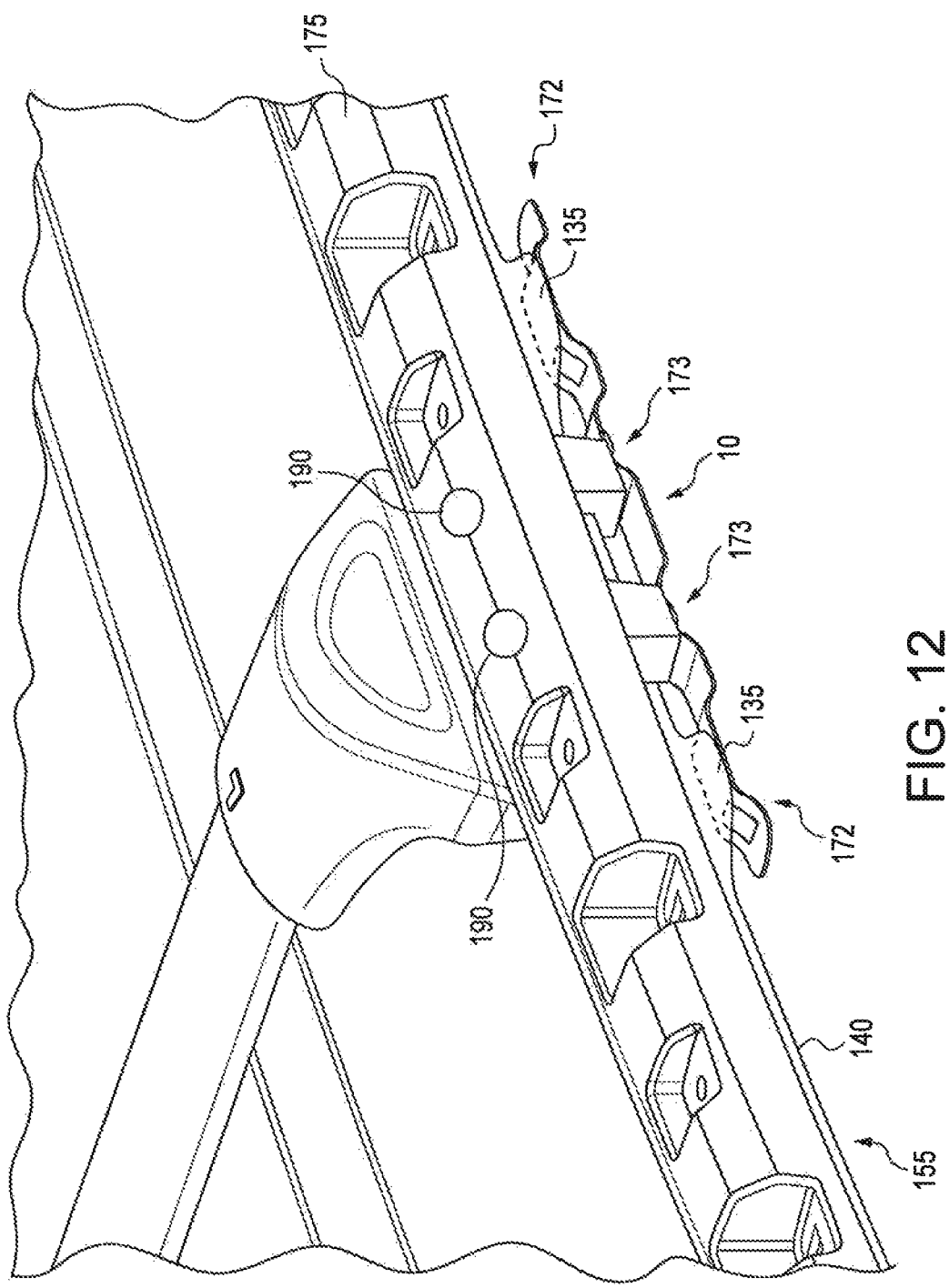
FIG. 12 is a perspective view of a roof rack carrier secured to the insert according to one aspect of the present disclosure.
Figure 13:
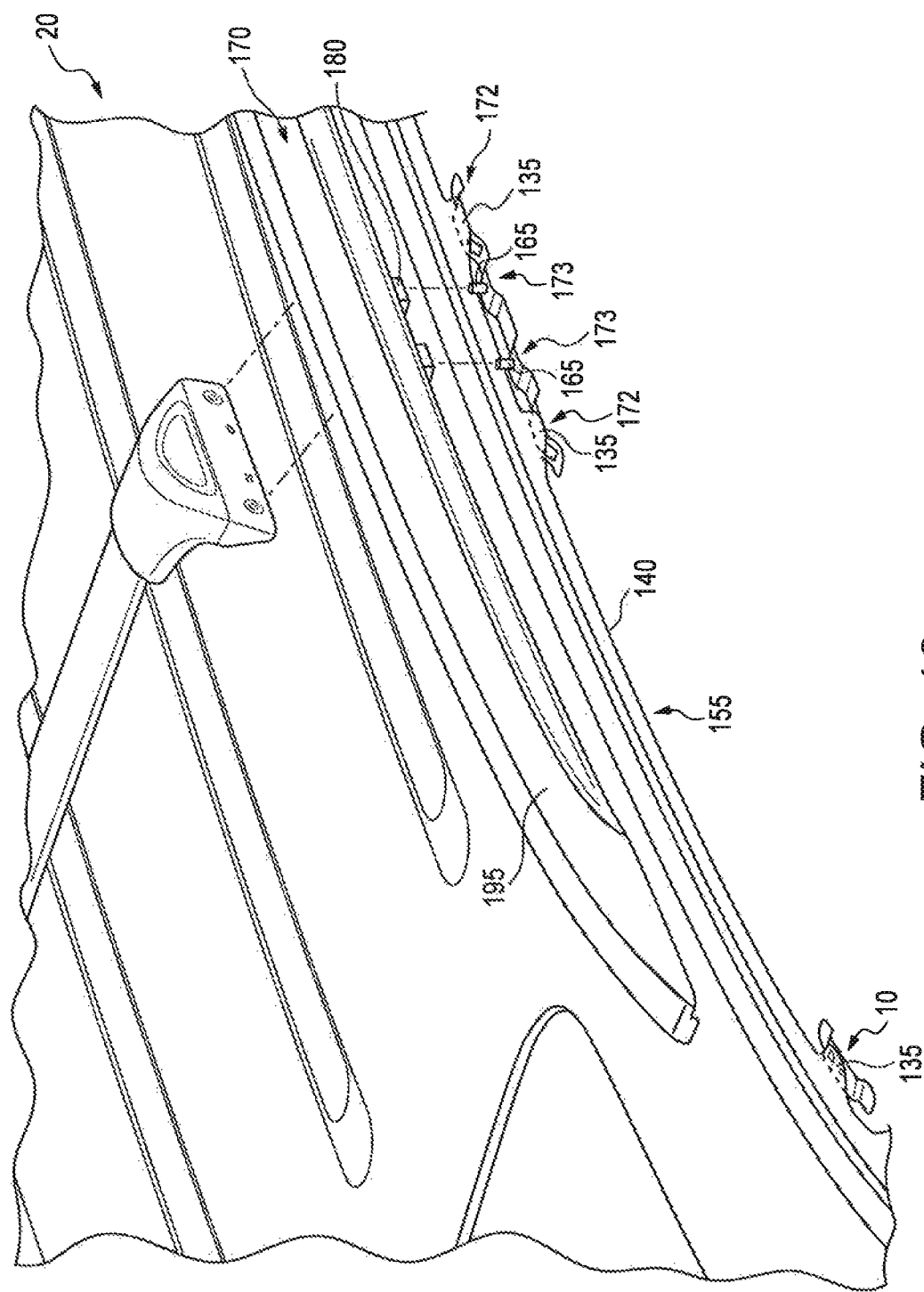
FIG. 13 is a partially exploded view of the roof rack according to one aspect of the present disclosure.

As shown in FIGS. 11 and 12, the roof rack 170 may include a carrier 175 housing a sleeve 180 with a lower aperture 183. Accordingly, the roof rack 170 may be positioned over the insert 10 and lowered until the joining member 165 is received in the sleeve 180 of the carrier 175 via the lower aperture 183 as shown in FIGS. 12 and 13. A collar nut 185 may then be inserted through an upper aperture 190 in the carrier 175 to threadingly engage the joining member 165 to secure the roof rack 170 to the insert 10. As shown in FIG. 13, a decorative cover 195 may then be secured to the carrier 175. In a non-limiting example, the carrier 175 may be a polymeric material and the sleeve 180 may be a metal insert. In a non-limiting example, the roof 20 may be comprised of a polymeric material such as an epoxy and may be reinforced with one or more materials including, but not limited to, carbon and glass fibers.

It is to be understood that the roof rack 170 can be joined to the insert 10 when the roof 20 does not include one or more tabs 135 extending from the flange 130. In a non-limiting example, the flange 130 may include only the horizontal portion 140 which may be provided with apertures (not shown) so that the joining member 165 can extend therethrough to be threadingly engaged with the collar nut 185, and/or so that the collar nut 185 can be extended through the aperture to threadingly engage the joining member 165.

In an embodiment, a method of assembling the vehicle roof structure 15 is provided. As shown in FIG. 1, a plurality of inserts 10 is provided for securing to the roof 20. The inserts 10 may be secured at portion 162 to the tabs 135 of the roof 20 by, for example, a clinched connection 161. Before or after the inserts 10 are secured to the roof 20, the adhesive 35 is applied around the entire perimeter of either the horizontal portion 140 of the flange 130, or the side panels 70, 75 and roof rails 85, 90 of the vehicle body 25. The roof 20 and vehicle body 25 are then positioned with respect to each other with the inserts 10 positioned between the vehicle body 25 and the tabs 135 to maintain the gap 30 between the vehicle body 25 and the flange 130 at a desired height for the adhesive 35 to directly bond the flange 130 to the body 25. As shown in FIG. 3B, the insert 10 is positioned outward of the adhesive 35 and outside of the dry zone 40, and the feet 50 of the inserts 10 are positioned outward beyond the tabs 135 to provide clearance for welding electrodes to be lowered from above the roof 20 to, for example, spot-weld the feet 50 to the vehicle body 25. Accordingly, the insert 10 remains in the finished vehicle as part of the roof structure 15. The resulting vehicle roof structure 15 may then be heated to cure the adhesive 35. Optionally, the inserts 10 may include a relief feature 65 configured to deform in response to thermal expansion of the roof 20. Optionally, one or more of the inserts 10 may include a joining member 65 for securing a roof rack 170 thereto. The carrier 175 of the roof rack 170 may be positioned to receive the joining member 65 through the lower aperture 183 so that the joining member 65 is received in the sleeve 180. A collar nut 185 may then be inserted through the upper aperture 190 and threadingly engaged with the joining member 65 to secure the carrier 175 to the insert 10.

While, for purposes of simplicity of explanation, the method has steps described as executing serially, it is to be understood and appreciated that the present disclosure is not limited by the illustrated order, and some steps could occur in different orders and/or concurrently with other steps from that shown and described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle roof structure comprising:
   a vehicle body comprising a first material;
   a roof comprising a second material that is different than the first material, wherein the roof includes a flange; and
   an insert positioned between the vehicle body and the roof to maintain a gap between the vehicle body and the flange, the insert includes a joining member that is securable to a roof rack.

2. The vehicle roof structure of claim 1, wherein the flange includes a first tab and a second tab, wherein the first tab and the second tab extend outward from the flange, and wherein the joining member is positioned along the length of the roof between the first tab and the second tab.

3. The vehicle roof structure of claim 2, wherein the insert includes a second joining member positioned along the length of the roof between the first tab and the second tab.

4. The vehicle roof structure of claim 2, wherein the insert includes a first foot that is secured to the vehicle body, a first shoulder positioned between the first tab and the vehicle body that is secured to the first tab, and a first leg extending from the first foot to the first shoulder.

5. The vehicle roof structure of claim 4, further comprising a roof rack secured to the joining member.

6. The vehicle roof structure of claim 4, further comprising an adhesive positioned in the gap that bonds the flange to the vehicle body, wherein the adhesive extends along the flange around a perimeter of the roof, and wherein the insert is positioned outward of the adhesive.

7. The vehicle roof structure of claim 4, wherein the insert includes a second foot secured to the vehicle body, a second shoulder, and a second leg extending from the second foot to the second shoulder, and wherein the joining member extends from the second shoulder.

8. The vehicle roof structure of claim 4, wherein the insert includes a second shoulder, and a second leg extending from the first foot to the second shoulder, and wherein the joining member extends from the second shoulder.

9. A vehicle roof structure comprising:
   a vehicle body comprising a first material;
   a roof comprising a second material that is different than the first material, wherein the roof includes a flange with a first tab and a second tab, wherein the first tab and the second tab extend outward from the flange; and
   an insert positioned between the vehicle body and the roof to maintain a gap between the vehicle body and the flange, wherein the insert is secured to the first tab and the second tab, and wherein the insert includes a joining member that is securable to a roof rack.

10. The vehicle roof structure of claim 9, wherein the joining member is positioned along the length of the roof between the first tab and the second tab.

11. The vehicle roof structure of claim 10, wherein the insert includes a second joining member positioned along the length of the roof between the first tab and the second tab.

12. The vehicle roof structure of claim 9, wherein the insert includes a first foot secured to the vehicle body, a first shoulder positioned between the first tab and the vehicle body that is secured to the first tab, and a first leg extending from the first foot to the first shoulder, and wherein the insert includes a second foot secured to the vehicle body, a second shoulder positioned between the second tab and the vehicle body that is secured to the second tab, and a second leg extending from the second foot to the second shoulder.

13. The vehicle roof structure of claim 12, wherein the insert includes a third shoulder positioned along the length of the roof between the first shoulder and the second shoulder, and wherein the joining member extends from the third shoulder.

14. The vehicle roof structure of claim 13, further comprising an adhesive positioned in the gap that bonds the flange to the vehicle body, wherein the adhesive extends along the flange around a perimeter of the roof, and wherein the insert is positioned outward of the adhesive.

15. A vehicle roof structure comprising:
a vehicle body comprising a first material;
a roof comprising a second material that is different than the first material, wherein the roof includes a flange; and
an insert positioned between the vehicle body and the roof to maintain a gap between the vehicle body and the flange, the insert includes a first foot secured to the vehicle body, a first shoulder secured to the flange, a first leg extending from the first foot to the first shoulder, wherein a relief feature is positioned on the first leg, and wherein the insert includes a joining member that is securable to a roof rack.

16. The vehicle roof structure of claim 15, wherein the flange includes a first tab and a second tab, wherein the first tab and the second tab extend outward from the flange, and wherein the joining member is positioned along the length of the roof between the first tab and the second tab.

17. The vehicle roof structure of claim 16, wherein the insert includes a second foot secured to the vehicle body, a second shoulder, and a second leg extending from the second foot to the second shoulder, wherein the joining member extends from the second shoulder.

18. The vehicle roof structure of claim 17, wherein the insert is secured to the first tab and the second tab.

19. The vehicle roof structure of claim 18, wherein the insert includes a third shoulder, wherein the first tab is secured to the first shoulder and the second tab is secured to the third shoulder, and wherein the second shoulder is positioned along the length of the roof between the first shoulder and the third shoulder.

20. The vehicle roof structure of claim 19, wherein the insert includes a second joining member that extends from a fourth shoulder, and wherein the fourth shoulder is positioned along the length of the roof between the second shoulder and the third shoulder.

* * * * *